United States Patent Office 2,977,343
Patented Mar. 28, 1961

2,977,343

STEAM CURING ISOOLEFIN-MULTIOLEFIN RUBBERY COPOLYMERS

Robert L. Zapp, Florham Park, and Miller W. Swaney, Westfield, N.J., assignors to Esso Research and Engineering Company, a corporation of Delaware No Drawing. Filed May 14, 1957, Ser. No. 659,178

2 Claims. (Cl. 260—79.5)

The present invention concerns improved vulzanizates of rubbery isoolefin-multiolefin copolymers as well as the method of preparing them. Specifically it concerns steam curing butyl rubber in the presence of certain hydrocarbon dithiocarbamate substances.

Both synthetic and natural rubbers have been cured in the presence of steam using sulfur as the curing agent. More recently it has been noted that the curing time may be shortened by the use of accelerators such as metal salts or dimethyl dithiocarbamic acid. However, even when accelerators of this type are employed in the curing process, the vulcanizates produced are usually susceptible to ozone attack. Since these vulcanizates are generally used in products that are exposed to the elements, the ozone resistance of the rubbery vulcanizate is an important property.

It has now been discovered that vulcanizates which are highly resistant to ozone may be prepared by steam curing the rubbery polymer in the presence of a hydrocarbon dithiocarbamate compound having higher molecular weight hydrocarbons attached to its nucleus. It has been noted that very good results are obtained when at least one of the hydrocarbon groups contains 4 or more carbon atoms, e.g., 4 to 14.

While the present invention may be applied to natural rubber or synthetic rubbers, it has been found to be especially effective in butyl rubber. The high unsaturation rubbery polymers do not show the improvement observed with butyl rubber because at most normal states of cure these rubbers have a large excess of unreacted double bond sites. Therefore small changes in the state of vulcanization or cross linking does not alter ozon resistance.

The expression "butyl rubber" as employed in the specification and claims is intended to include copolymers having about 90–99.5% by weight of an isoolefin which has about 4–7 carbon atoms, and about 10–0.5% by weight of a conjugated multiolefin having about 4–14 carbon atoms. The term "butyl rubber" is described in an article by R. M. Thomas et al. in Industrial Engineering and Chemistry, vol. 32, pages 1283 et seq., October 1940.

In preparing butyl rubber polymer, the isoolefin and multiolefin are mixed in the ratio of a major proportion of the multiolefin, the preferred range being about 70 to 99.5, preferably 85 to 99.5 parts by weight of the isoolefin to about 30 to 0.5, preferably 0.5 to 15 parts by weight of the multiolefin. High purity is desirable in both materials, it being preferable to use an isoolefin of at least 98% purity, although satisfactory copolymers may be made from multiolefins of a lower purity.

In general, the rubber comprises the reaction product of a $C_4$ to $C_7$ isoolefin, such as isobutylene or 2-methyl-1-butene, with a $C_4$ to $C_{10}$ conjugated diolefin, such as isoprene, butadiene or piperylene. The reaction product of isobutylene and isoprene is preferred. For instance, 97 to 97.5% by weight of isobutylene is reacted with 2.5 to 3.4% by weight of isoprene.

The mixture of monomers is cooled to a temperature within the range between about 0° and —200° C., preferably between about —40° and —160° C. It is especially preferred that the reaction temperature be between —60° and —130° C. The materials may be cooled by the use of a refrigerating jacket, which surrounds the mixing tank, for instance using liquefied ethylene as cooling liquid. Alternatively, the mixture may be cooled by means of an internal refrigerant. In this case, it is mixed directly with the starting materials. Refrigerants which have been found to be satisfactory for internal use are liquid propane, solid carbon dioxide, liquid ethane, liquid ethylene, etc.

The cold mixture is polmerized by the addition of a Friedel-Crafts catalyst, preferably an aluminum halide catalyst in a liquid or dissolved form, with vigorous agitation. The amount of catalyst employed is generally about 0.15% to about 1.0% by weight of the mixed olefins. The liquid catalyst may be sprayed on to the surface of the rapidly stirred mixture, or it may be introduced in the form of a pressured stream.

The polymerization reaction proceeds rapidly. The polymer precipitates out of solution in the form of a slurry of flocculent white solid. When the polymerization has reached the desired stage, the material is conveniently recovered by charging the whole mixture into warm water which may contain alcohol, ether, aldehyde or organic acid to inactivate the catalyst. The polymer is then recovered from the water suspension in any convenient manner, such as straining or filtering. It is then dried either by passing it through a tunnel drier, or on a mill. The product has plastic and elastic properties.

The polymer has a Staudinger molecular weight between approximately 20,000 to 150,000. It is desired that the molecular weight fall between about 35,000 and 100,000 and it is preferred that it be in the range between 45,000 and 60,000. The material has a Wijs iodine number between about 0.5 and 50, generally between about 1 and 15. The preparation of the above rubbery butyl copolymer is described in U.S. Patent No. 2,356,128 to which reference may be had for further details.

According to the present invention butyl rubber is cured in open steam at a temperature between about 120 and 200° C. for from about 20 seconds up to 3 hours. In the presence of a sulfur-containing curing agent and a dithiocarbamate in which at least one of the two hydrocarbon groups that are attached to it contains 4 to 10 or 14 carbon atoms. A preferred embodiment of the invention is where at least one or both of the hydrocarbon groups is cyclic and contains 6 to 10 carbon atoms, for instance, aryl, alkaryl, cyclo paraffinic, alkyl, aryl and diaryl derivatives. It has been noted that these latter accelerators produce vulcanizates that are exceptionally resistant to ozone oxidation.

The accelerators coming within the purview of the invention have the following general formula:

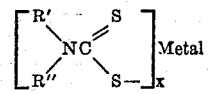

wherein $R'$ is an alkyl, aryl, cycloparaffinic, or alkaryl group containing 4 to 10 carbon atoms; $R''$ is an alkyl, aryl, cycloparaffinic or alkaryl group containing 2 to 10 carbon atoms; the metal is tellurium, copper, zinc, lead, iron, calcium, strontium, potassium or sodium; $x$ is the valence of the metal and is generally between 1 and 4, although it is usually better to use metals having a valence of 2 to 4. Group I–B and VI–A metals in the periodic table, especially tellurium and copper, are preferred because they bring about a faster cure. The preferred hydrocarbon groups are butyl, pentyl, hexyl, octyl, nonyl, decyl, cyclohexyl, benzyl and combinations thereof with themselves or lower hydrocarbon groups such as ethyl and propyl.

The curing agent should be sulfur or a sulfur-liberating substance such as morpholine disulfide, or thiuram tetrasulfide. Generally between about 1 and 10 parts by weight of the sulfur-liberating compounds and a minor amount of the dithiocarbamate accelerator, say, about 0.5 to 10 parts by weight, are mixed with 100 parts by weight of butyl rubber and cured in the presence of open steam for from about 15 to 100 minutes. For most purposes about 1 to 5 parts by weight of the dithiocarbamate is sufficient to improve the vulcanizate. It is generally desirable to also have about 3 to 10 parts by weight of a divalent metal oxide, such as zinc oxide, present during the curing operation.

The compounded butyl rubber is usually extruded at a temperature between 100 and 130° C. and cured in position. That is to say, a wire coated with a film, say, about 1/64" to 1/2 inch thick may be passed through a steam chest at such a rate that the compounded butyl rubber film is cured by the time it leaves the chest. One of the advantages of the present invention is that the rubber is thoroughly cured and does not have a tacky surface which is frequently connected with this type of cure. It has also been noted that the accelerators of the present invention form a more homogeneous mixture with the butyl rubber and it is believed that this at least partially accounts for the improved vulcanizate which is obtained.

The ozone resistant butyl rubbers may be blended and cured with a higher unsaturation rubber using special curing systems such as an amine, e.g., diortho tolyl guanidine, and sulfur. For instance about 1 to 50 parts of GR-S or natural rubber may be blended with 100 parts of butyl rubber and 1 to 4 parts of dithiocarbamate.

The following examples are given to more fully illustrate the various embodiments of the present invention. All recipes are in parts by weight.

EXAMPLE 1

Isobutylene-isoprene butyl rubber (GR-I-15), having a large Mooney viscosity after 8 min. at 212° F., of 41-49 was blended with zinc oxide, sulfur and various dithiocarbamates according to the following recipes:

Table I

|  | 1 | 2 | 3 | 4 | 5 | 6 | 7 | 8 | 9 | 10 | 11 |
|---|---|---|---|---|---|---|---|---|---|---|---|
| GR-I-15 | 100 | 100 | 100 | 100 | 100 | 100 | 100 | 100 | 100 | 100 | 100 |
| ZnO | 5 | 5 | 5 | 5 | 5 | 5 | 5 | 5 | 5 | 5 | 5 |
| Sulfur | 2 | 2 | 2 | 2 | 2 | 2 | 2 | 2 | 2 | 2 | 2 |
| Tellurium diethyl dithiocarbamate | 1 |  |  |  |  |  |  |  |  |  |  |
| Tellurium dimethyl dithiocarbamate | 0.84 | 1.7 |  |  |  |  |  |  |  |  |  |
| Tellurium dipropyl dithiocarbamate |  |  |  | 1.16 | 2.32 |  |  |  |  |  |  |
| Tellurium methyl, butyl-dithiocarbamate |  |  |  |  |  | 1.08 | 2.16 |  |  |  |  |
| Tellurium ethyl butyl-dithiocarbamate |  |  |  |  |  |  |  | 1.16 | 2.32 |  |  |
| Tellurium methyl octyl-dithiocarbamate |  |  |  |  |  |  |  |  |  | 1.4 | 2.8 |

Each sample of compounded rubber was pressed into a thin film 0.005 inch thick at 100° C. and cured in the presence of open steam for 45 min. at 160° C. Prior to the curing step, each sample was divided into two portions one of which was protected on both sides by layers of glass while the other was covered on only one side by a similar layer of glass and the other side exposed to the open steam. Both portions of each sample were then placed in cyclohexane which was at a temperature of 25° C. for 1 hour. At the end of this time the volume percent increase of each sample was measured. In the following table this is reported as percent volume swell.

Table II

| Percent Vol. Swell | 1 | 2 | 3 | 4 | 5 | 6 | 7 | 8 | 9 | 10 | 11 |
|---|---|---|---|---|---|---|---|---|---|---|---|
| Exposed Film | 870 | 950 | Soluble | 500 | 470 | 660 | 505 | 535 | 420 | 478 | 420 |
| Protected Film | 375 | 370 | 400 | 400 | 370 | 405 | 370 | 515 | 340 | 410 | 340 |

As the swell values of the test samples approach the figures obtained with the protected film, the curing process in steam more closely resembles the process which has been protected from water vapor. The results in Table II show that the action of the dimethyl and diethyl derivatives of the dithiocarbamate is readily deteriorated by water vapor whereas the dipropyl, methyl butyl, ethyl butly and methyloctyl dithiocarbamates produce vulcanizates which do not appreciably swell in the presence of cyclohexane. This indicates that the latter compounds are producing more bonds between polymer molecules thereby making them less susceptible to the attack of ozone. The amounts of the dithiocarbamates listed in Table I are molecular equivalents of the diethyl derivative. This method was employed to eliminate the possibility of a dilution effect. However, in each instance the molecular equivalents were doubled to bring out any dilution phenomenon.

The above experiment was repeated with the exception that all of the dithiocarbamate compounds containing cyclic hydrocarbons.

Table III

|  | 12 | 13 | 14 | 15 | 16 | 17 | 18 | 19 | 20 |
|---|---|---|---|---|---|---|---|---|---|
| GR-I-15 | 110 | 110 | 100 | 100 | 100 | 100 | 100 | 100 | 100 |
| ZnO | 5 | 5 | 5 | 5 | 5 | 5 | 5 | 5 | 5 |
| Sulfur | 2 | 2 | 2 | 2 | 2 | 2 | 2 | 2 | 2 |
| Tellurium methyl cyclohexyl-dithiocarbamate | 1.2 | 2.4 |  |  |  |  |  |  |  |
| Tellurium ethyl cyclohexyl-dithiocarbamate |  |  | 1.3 | 2.6 |  |  |  |  |  |
| Tellurium butyl cyclohexyl-dithiocarbamate |  |  |  |  | 1.5 | 3.0 |  |  |  |
| Tellurium ethyl benzyl-dithiocarbamate |  |  |  |  |  |  | 1.5 | 2.9 |  |
| Tellurium diethyl-dithiocarbamate |  |  |  |  |  |  |  |  | 1 |

Each sample was pressed into a film 0.005 inch thick at 100° C., divided into two portions one of which was protected and the other exposed to open steam for 45 min. at 160° C. Both portions of each sample were again placed in cyclohexane and the percent volume increase was measured.

Table IV

| Percent Vol. Swell | 12 | 13 | 14 | 15 | 16 | 17 | 18 | 19 | 20 |
|---|---|---|---|---|---|---|---|---|---|
| Exposed Film | 550 | 460 | 480 | 420 | 470 | 425 | 460 | 400 | 870 |
| Protected Film | 400 | 370 | 400 | 370 | 400 | 380 | 395 | 340 | 380 |

The cyclic compounds were consistently better than the alkyl compounds set forth in Table I especially when the other hydrocarbon group contained two or more carbon atoms. Of all of the tellurium dithiocarbamate studied, the alkyl aryl derivative, tellurium ethyl benzyl dithiocarbamate, was the best accelerator for curing butyl rubber in open steam and for this reason accelerators containing aryl groups are especially preferred.

EXAMPLE 2

A number of experiments was carried out to demonstrate that other metallic salts of dithiocarbamate acid also show the advantage of increasing the molecular weight of the modifying hydrocarbon groups. Example 1 was repeated using various zinc dithiocarbamates to accelerate the cure. The results are set forth in Table V below:

Table V

| | 21 | 22 | 23 | 24 | 25 | 26 | 27 |
|---|---|---|---|---|---|---|---|
| GR-I-15 | 100 | 100 | 100 | 100 | 100 | 100 | 100 |
| ZnO | 5 | 5 | 5 | 5 | 5 | 5 | 5 |
| Sulfur | 2 | 2 | 2 | 2 | 2 | 2 | 2 |
| Zinc dimethyl-dithiocarbamate | 1 | | | | | | |
| Zinc diethyl-dithiocarbamate | | 1 | | | | | |
| Zinc dibutyl-dithiocarbamate | | | 1 | 2 | 4 | | |
| Zinc dibenzyl-dithiocarbamate | | | | | | 2 | 4 |

Each sample was pressed into a film 0.005 inch thick, divided into two portions one protected and the other exposed and cured for 45 min. at 160° C. Both portions of each sample were then evaluated for percent volume swell in cyclohexane. The results are set forth in Table VI:

Table VI

| Percent Vol. Swell | 21 | 22 | 23 | 24 | 25 | 26 | 27 |
|---|---|---|---|---|---|---|---|
| Exposed Film | 2,900 | 1,740 | 910 | 835 | 640 | 570 | 530 |
| Protected Film | 425 | 420 | 510 | 450 | 440 | 480 | 430 |

The data show that the dibenzyl derivative was very effective. This gives a further basis for the desirability of using aryl and diaryl derivatives of dithiocarbamate. It may be noted that in Table V the dithiocarbamates were not employed as molar equivalents of the diethyl derivative as they were in Tables I and III above.

EXAMPLE 3

While fillers such as carbon blacks tend to obscure the differences between the exposed and protected steam cured fillers, an experiment was carried out to demonstrate that even in high load compounded butyl rubber the advantages of increased molecular weight in the accelerator are evident.

The methods set forth in Example 1 were repeated with the exception that a high abrasion furnace black was also compounded into the rubber mixture according to the following recipe:

Table VII

| | 28 | 29 |
|---|---|---|
| GR-I-15 | 100 | 100 |
| Zinc Oxide | 5 | 5 |
| HAF Carbon | 50 | 50 |
| Tellurium diethyl dithiocarbamate | 1 | |
| Tellurium ethyl benzyl dithiocarbamate | | 1.5 |
| Sulfur | | 2 |

The samples were extruded and cured as in Example 1 and the percent volume swell determined in cyclohexane.

Table VIII

| Percent Vol. Swell | 28 | 29 |
|---|---|---|
| Exposed Film | 350 | 260 |
| Protected Film | 240 | 250 |

These data show that the ethyl benzyl derivative brings about a steam cure equivalent to that obtained with the protected film while the diethyl derivative still tends to swell in the presence of cyclohexane.

EXAMPLE 4

A number of experiments was carried out to determine the effect of having higher molecular weight hydrocarbons attached to the dithiocarbamate on the ozone resistance of steam cured butyl rubber. Samples of isoprene-isobutylene butyl rubber (GR-I-50) were compounded as follows, extruded at a die temperature of 100–130° C. and cured in the presence of 75 p.s.i.g. of steam for 45 minutes at 160° C.

Table IX

| | 30 | 31 | 32 |
|---|---|---|---|
| GR-I-50 | 100 | 100 | 100 |
| FEF Carbon Black | 60 | 60 | 60 |
| Naphthenic Oil | 15 | 15 | 15 |
| Paraffin Wax (M.P. 130° F.) | 10 | 10 | 10 |
| Zinc Oxide | 5 | 5 | 5 |
| Sulfur | 1.5 | 1.5 | 1.5 |
| Tetramethyl thiuram disulfide | 1.5 | | |
| Mercapto benzo thiazole | 2 | | |
| Tellurium diethyl dithiocarbamate | | 1.5 | |
| Tellurium ethyl benzyl dithiocarbamate | | | 2.25 |

The naphthenic oil used in the above recipe had a Saybolt viscosity of 508 seconds at 100° F. and 58 seconds at 210° F., an API gravity of 25.8 and a 445° F. flash point.

The cured samples, which had a Shore hardness of about 50, were bent around a mandril which was 2 inches in diameter and subjected to an atmosphere containing 75 parts by weight of ozone/hundred million parts by weight air (p.p.h.m.) at 100° F. for various periods of time. Each sample was evaluated for cracks according to the weathering test standards set forth in ASTM D-1171-5 IT.

Table X

| Exposure Time, Hrs. | 30 | 31 | 32 |
|---|---|---|---|
| | Crack Ratings | | |
| 5 | 0 | 0 | 0 |
| 24 | 2 | 2 | 0 |
| 48 | 2 | 2 | 0 |
| 51 | 2 | 2 | 0 |

The ratings may be defined as follows:

0 = no cracks
1 = small cracks
2 = medium cracks
3 = large cracks

The data show that a molecular equivalent of tellurium ethyl benzyl dithiocarbamate is superior in ozone resistance to the other accelerators employed.

EXAMPLE 5

A study was conducted to determine the effect of exposing extended samples of rubber strips 0.075 inch thick to a 38° C. atmosphere consisting of 50 p.p.h.m. of ozone in air. The rubber samples were compounded according to the following recipes and cured in steam for 45 minutes at 160° C.

Table XI

|  | 33 | 34 | 35 |
|---|---|---|---|
| GR-I-18 | 100 | 100 | 100 |
| HAF Carbon Black | 30 | 30 | 30 |
| SRF Carbon Black | 60 | 60 | 60 |
| Naphthenic Oil | 10 | 10 | 10 |
| Zinc Oxide | 5 | 5 | 5 |
| Sulfur | 1.5 | 1.5 | 1.5 |
| Tetramethyl thiuram disulfide | 1.5 |  |  |
| Mercapto benzo thiazole | 2.0 |  |  |
| Tellurium diethyl dithiocarbamate |  | 2.0 |  |
| Tellurium ethyl benzyl dithiocarbamate |  |  | 2.8 |

Each sample, which had a Shore hardness of about 70, was extended 50%, subjected to the ozone atmosphere for various periods of time and evaluated as before:

Table XII

| Exposure Time, hrs. | 33 | 34 | 35 |
|---|---|---|---|
|  | Crack Ratings | | |
| 30 | 0 | 0 | 0 |
| 48 | 2 | 0 | 0 |
| 54 | 3 | 1 | 0 |
| 80 | 3 | 1 | 0 |

Again, sample 35, which was prepared according to the present invention completely resisted ozone attack for more than 80 hours while the controls failed in 48 to 54 hours.

EXAMPLE 6

A series of experiments was carried out to determine the length of time which butyl rubber samples to be used to insulate wire could be exposed to a high concentration of ozone before they exhibited cracking. Samples were prepared according to the following recipe and cured for 100 minutes at 200° C. in open steam.

Table XIII

|  | 36 | 37 |
|---|---|---|
| GR-I-15 | 100 | 100 |
| Zinc Oxide | 5 | 5 |
| Calcined Kaolin Clay | 135 | 135 |
| Stearic Acid | 1 | 1 |
| Sulfur | 2 | 2 |
| Tellurium diethyl dithiocarbamate | 2.7 |  |
| Tellurium ethyl benzyl dithiocarbamate |  | 3.7 |

Sample 36 cracked in 21 minutes when extended 50% and exposed to 0.2 volume percent ozone in air at 25° C. while sample 37 did not crack for 1 hour under the same conditions. These results illustrate the outstanding properties of the steam cured butyl rubber of the present invention.

Resort may be had to various modifications and variations of the present invention without departing from the spirit of the discovery or the scope of the appended claims.

What is claimed is:

1. A process for curing a butyl rubber copolymer of 85 to 99.5 wt. percent of a $C_4$–$C_7$ isoolefin and 0.5 to 15 wt. percent of a $C_4$–$C_{10}$ multiolefin which comprises, mixing said copolymer with 0.5 to 10 parts per 100 parts of said rubber tellurium ethyl benzyl dithiocarbamate, said compound being employed as a sole accelerator, additionally mixing said butyl rubber copolymer with sulfur and curing the resulting mixture at a temperature of 120° to 200° C. in the presence of steam so as to produce a vulcanizate of improved ozone resistance and highly resistant to swelling in cyclohexene.

2. A steam cured butyl rubber copolymer composition which comprises 100 parts by weight of butyl rubber copolymer, said copolymer being a copolymer of 85 to 99.5 wt. percent of $C_4$–$C_7$ isoolefin and 0.5 to 15 wt. percent of $C_4$ to $C_{10}$ multiolefin, and about 0.5 to 10 parts by weight of tellurium ethyl benzyl dithiocarbamate, said tellurium ethyl benzyl dithiocarbamate being the sole accelerator present in said composition.

References Cited in the file of this patent

UNITED STATES PATENTS

| 2,356,128 | Thomas et al. | Aug. 22, 1944 |
| 2,492,170 | Mast et al. | Dec. 27, 1949 |
| 2,702,286 | Iknayan et al. | Feb. 15, 1955 |

FOREIGN PATENTS

| 587,830 | Great Britain | May 7, 1947 |
| 591,627 | Great Britain | Aug. 25, 1947 |

OTHER REFERENCES

Vanderbilt Rubber Handbook, 1948, R. T. Vanderbilt, p. 80–p. 50, para. 2.

Barron: "Modern Synthetic Rubbers." Chapman & Hall, London (1949), pp. 480–483.